United States Patent
Yoo et al.

(10) Patent No.: US 10,848,285 B2
(45) Date of Patent: Nov. 24, 2020

(54) METHOD AND APPARATUS FOR TRANSMITTING SOUNDING REFERENCE SIGNAL IN WIRELESS COMMUNICATION SYSTEM

(71) Applicant: Samsung Electronics Co., Ltd., Suwon-si (KR)

(72) Inventors: Hyun Il Yoo, Suwon-si (KR); Cheol Kyu Shin, Suwon-si (KR); Tae Young Kim, Suwon-si (KR); Hyung Ju Nam, Suwon-si (KR); Jee Hwan Noh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/193,632

(22) Filed: Nov. 16, 2018

(65) Prior Publication Data

US 2019/0158236 A1    May 23, 2019

(30) Foreign Application Priority Data

Nov. 17, 2017  (KR) .......................... 10-2017-0154302

(51) Int. Cl.
*H04W 72/04* (2009.01)
*H04L 5/00* (2006.01)

(52) U.S. Cl.
CPC ............ *H04L 5/005* (2013.01); *H04L 5/0048* (2013.01); *H04L 5/0053* (2013.01); *H04L 5/0091* (2013.01); *H04W 72/042* (2013.01); *H04W 72/0446* (2013.01)

(58) Field of Classification Search
CPC .............. H04W 72/1268; H04W 72/14; H04L 5/0078; H04L 5/0048; H04L 5/0007
See application file for complete search history.

(56) References Cited

U.S. PATENT DOCUMENTS

| | | | |
|---|---|---|---|
| 2011/0244800 A1* | 10/2011 | Bogestam | H04W 4/80 455/41.2 |
| 2011/0268028 A1 | 11/2011 | Stern-Berkowitz et al. | |
| 2016/0226639 A1* | 8/2016 | Xiong | H04B 1/713 |
| 2018/0206132 A1* | 7/2018 | Guo | H04B 7/0404 |
| 2020/0067676 A1* | 2/2020 | Yi | H04W 2/04 |

OTHER PUBLICATIONS

Huawei, HiSilicon, "UL SRS design for beam management and CSI acquisition", 3GPP TSG RAN WG1 Meeting #90bis, Oct. 9-13, 2017, 13 pages, R1-1717307.

(Continued)

*Primary Examiner* — Wei Zhao

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). An operating method of a terminal in a wireless communication system includes: receiving SRS configuration information from a base station; and transmitting an SRS according to the SRS configuration information. The SRS configuration information includes a slot configuration comprising a slot periodicity for transmitting a SRS, and a slot offset for the slot periodicity.

21 Claims, 12 Drawing Sheets

(56) References Cited

OTHER PUBLICATIONS

CATT, "Remaining design aspects of slot format indication", 3GPP TSG RAN WG1 Meeting #90bis, 6 pages, R1-1717824.
Intel Corporation, "Discussion on SRS for NR", 3GPP TSG RAN WG1 Meeting #90bis, Oct. 9-13, 2017, 5 pages, R1-1717375.
Vivo, "Discussion on SRS design", 3GPP TSG RAN WG1 Meeting #90bis, 4 pages, R1-1717479.
International Search Report dated Feb. 21, 2019 in connection with International Patent Application No. PCT/KR2018/014030, 3 pages.
Written Opinion of the International Searching Authority dated Feb. 21, 2019 in connection with International Patent Application No. PCT/KR2018/014030, 5 pages.
Supplemental European Search Report in connection with European Application No. 188783195 dated Oct. 13, 2020, 11 pages.
Catt, "Remaining issues on SRS," R1-1715809, 3GPP TSG RAN WG1 Meeting NR#3, Nagoya, Japan, Sep. 18-21, 2017, 4 pages.
ZTE, et aL, "Details of UI beam management," R1-1717430, 3GPP TSG RAN WG1 Meeting 90bis, Prague, CZ, Oct. 9-13, 2017, 6 pages.
ZTE, et aL, "Discussion on SRS design for NR," R1-1717435, 3GPP TSG RAN WG1 Meeting 90bis, Prague, CX, Oct. 9-13, 2017, 9 pages.

\* cited by examiner

METHOD AND APPARATUS FOR TRANSMITTING SOUNDING REFERENCE SIGNAL IN WIRELESS COMMUNICATION SYSTEM

CROSS-REFERENCE TO RELATED APPLICATION

This application is based on and claims priority under 35 U.S.C. § 119 to Korean Patent Application No. 10-2017-0154302, filed on Nov. 17, 2017, in the Korean Intellectual Property Office, the disclosure of which is incorporated by reference herein in its entirety.

BACKGROUND

1. Field

The present disclosure generally relates to a wireless communication system, and more particularly to an apparatus and a method for transmitting a sounding reference signal in a wireless communication system.

2. Description of Related Art

The above information is presented as background information only to assist with an understanding of the present disclosure. No determination has been made, and no assertion is made, as to whether any of the above might be applicable as prior art with regard to the present disclosure.

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Beamforming is a technique by which radio waves are concentrated so as to arrive on an area in a particular direction using two or more array antennas to thereby increase the transmission distance, while the strength of signals received in directions other than the particular direction is decreased in order to reduce unnecessary signal interference. When beamforming is implemented, an increase in the size of a service area and a reduction in signal interference may be expected.

To support communication for beamforming, beamforming for an uplink and a downlink is necessary, in which case it is very efficient to use a Sounding Reference Signal (SRS) as a training signal for uplink beamforming. Therefore, a technique for transmitting an SRS in a wireless communication system is under discussion.

SUMMARY

Based on the foregoing discussion, the present disclosure provides an apparatus and a method for transmitting a Sounding Reference Signal (SRS) in a wireless communication system.

The present disclosure provides a resource allocation apparatus and a resource allocation method for SRS transmission in a wireless communication system.

To solve the foregoing problem, a method for a terminal according to an embodiment of the present disclosure includes: receiving SRS configuration information from a base station; and transmitting an SRS according to the SRS configuration information.

An apparatus and a method according to various embodiments of the present disclosure may perform resource allocation for SRS transmission in order to obtain uplink channel information and to measure a beam for an uplink in a wireless communication system.

Further, an apparatus and a method according to various embodiments of the present disclosure may transmit an SRS using wideband frequency hopping in a wireless communication system.

In addition, an apparatus and a method according to various embodiments of the present disclosure may perform time-domain resource allocation for SRS transmission in a wireless communication system.

A user equipment (UE) in a wireless communication system is provided. The UE includes at least one transceiver, and at least one processor operably coupled to the at least one transceiver. The at least one processor is configured to control the at least one transceiver to receive, from a base station, a configuration message regarding a sounding reference signal (SRS), and control the at least one transceiver to transmit, to the base station, at least one reference signal based on the configuration message. Hehein, the configuration message comprises a slot configuration comprising a slot periodicity for transmitting a SRS, and a slot offset for the slot periodicity.

A base station in a wireless communication system is provided. The base station includes at least one transceiver, and at least one processor operably coupled to the at least one transceiver. The at least one processor is configured to control the at least one transceiver to transmit, to a UE, a configuration message regarding a SRS, and control the at least one transceiver to receive, from the UE, at least one reference signal based on the configuration message. Herein, the configuration message comprises a slot configuration comprising a slot periodicity for transmitting a SRS, and a slot offset for the slot periodicity.

A method for operating a UE in a wireless communication system is provided. The method includes receiving, from a base station, a configuration message regarding a SRS, transmitting, to the base station, at least one reference signal based on the configuration message. Herein, the configuration message comprises a slot configuration comprising a slot periodicity for transmitting a SRS, and a slot offset for the slot periodicity.

A method for operating a base station in a wireless communication system is provided. The method includes transmitting, to a UE, a configuration message regarding a SRS, and receiving, from the UE, at least one reference signal based on the configuration message. Herein, the configuration message comprises a slot configuration comprising a slot periodicity for transmitting a SRS, and a slot offset for the slot periodicity.

The effects obtainable from the present disclosure are not limited to the effects mentioned above, and other effects not mentioned will be clearly understood by those skilled in the art from the following description.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The terms used in the present disclosure are only used to describe specific embodiments, and are not intended to limit the present disclosure. A singular expression may include a plural expression unless they are definitely different in a context. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

Hereinafter, various embodiments of the present disclosure will be described based on an approach of hardware. However, various embodiments of the present disclosure include a technology that uses both hardware and software and thus, the various embodiments of the present disclosure may not exclude the perspective of software.

The present disclosure relates to a method and an apparatus for transmitting a Sounding Reference Signal (SRS) in a wireless communication system. Specifically, the present disclosure describes a resource allocation method for transmitting an SRS in a wireless communication system.

As used herein, a term referring to a signal, a term referring to a channel, a term referring to control information, terms referring to network entities, a term referring to a component of an apparatus, and the like are used for convenience of explanation. Therefore, the present disclosure is not limited by the following terms, and other terms having equivalent technical meanings may be used.

Further, although the present disclosure illustrates various embodiments using terms used in some communication standards (e.g., 3rd Generation Partnership Project (3GPP)), these standards are provided merely for convenience of description. Various embodiments of the present disclosure may be easily modified and applied to other communication systems.

Figure 1:
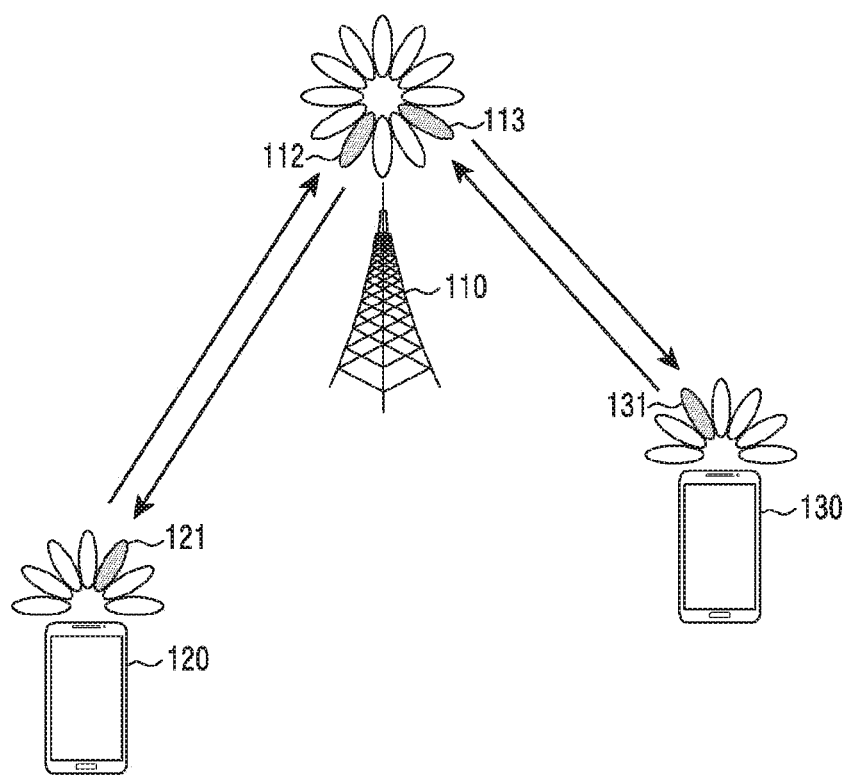
FIG. 1 illustrates a wireless communication system according to various embodiments of the present disclosure.

FIG. 1 illustrates a wireless communication system according to various embodiments of the present disclosure. FIG. 1 illustrates a base station 110, a terminal 120, and a terminal 130 as some nodes using a wireless channel in the wireless communication. Although FIG. 1 shows only one base station, another base station equivalent or similar to the base station 110 may be further included.

The base station 110 is a piece of network infrastructure that provides wireless access for the terminals 120 and 130. The base station 110 has coverage defined as a certain geographic area based on the distance over which the base station 110 can transmit a signal. The base station 110 may be referred to as an Access Point (AP), an eNodeB (eNB), a 5th-Generation (5G) node, a wireless point, a Transmission/Reception Point (TRP), or other terms with equivalent technical meanings, in addition to a base station.

Each of the terminal 120 and the terminal 130 is a device used by a user, and communicates with the base station 110 through a wireless channel. In some cases, at least one of the terminal 120 and the terminal 130 may be operated without a user's involvement. That is, at least one of the terminal 120 and the terminal 130 may be a device performing Machine-Type Communication (MTC), and may not be carried by a user. Each of the terminal 120 and the terminal 130 may be referred to as User Equipment (UE), a mobile station, a subscriber station, a remote terminal, a wireless terminal, a user device, or other terms with equivalent technical meanings, in addition to a terminal.

The base station 110, the terminal 120, and the terminal 130 may transmit and receive radio signals in a millimeter wave (mmWave) band (e.g., 28 GHz, 30 GHz, 38 GHz, and 60 GHz). Here, in order to improve channel gain, the base station 110, the terminal 120, and the terminal 130 may perform beamforming. Here, beamforming may include transmission beamforming and reception beamforming. That is, the base station 110, the terminal 120, and the terminal 130 may assign directivity to a transmission signal or a reception signal. To this end, the base station 110 and the terminals 120 and 130 may select serving beams 112, 113, 121, and 131 through a beam search procedure or a beam management procedure. After the serving beams 112, 113, 121, and 131 are selected, subsequent communication may be performed through resources that are in a Quasi Co-Located (QCL) relationship with the resources used to transmit the serving beams 112, 113, 121, and 131.

When the large-scale characteristics of a channel carrying a symbol on a first antenna port can be inferred from a channel carrying a symbol on a second antenna port, the first antenna port and the second antenna port may be said to be in a QCL relationship. For example, the large-scale characteristics may include at least one of a delay spread, a Doppler spread, a Doppler shift, an average gain, an average delay, and a spatial receiver parameter.

Figure 2:
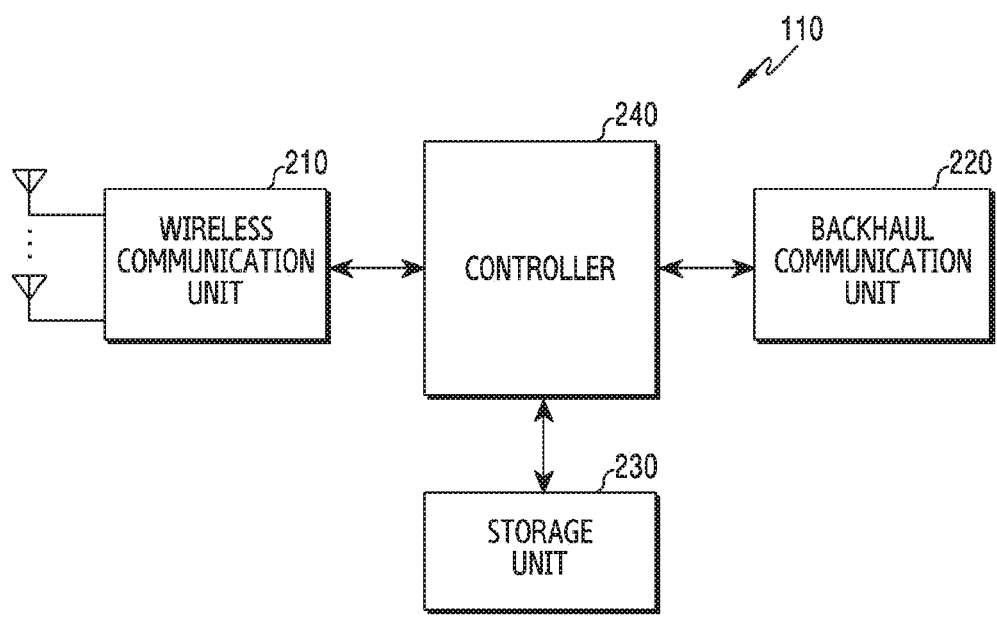
FIG. 2 illustrates the configuration of a base station in a wireless communication system according to various embodiments of the present disclosure.

FIG. 2 illustrates the configuration of a base station in a wireless communication system according to various embodiments of the present disclosure. The configuration illustrated in FIG. 2 may be construed as the configuration of the base station 110. The terms 'unit,' '-or/er,' and the like used herein indicate a unit for processing at least one function or operation, which may be implemented by hardware, software, or a combination thereof.

Referring to FIG. 2, the base station includes a wireless communication unit 210, a backhaul communication unit 220, a storage unit 230, and a controller 240.

The wireless communication unit 210 performs functions for transmitting or receiving a signal through a wireless channel. For example, the wireless communication unit 210 performs a function of conversion between a baseband signal and a bit stream according to the physical layer specification of a system. For example, in data transmission, the wireless communication unit 210 encodes and modulates a transmitted bit stream to generate complex symbols. Further, in data reception, the wireless communication unit 210 demodulates and decodes a baseband signal to reconstruct a received bit stream.

The wireless communication unit 210 upconverts a baseband signal into a Radio-Frequency (RF) band signal, and may transmit the RF band signal through an antenna. The wireless communication unit 210 downconverts an RF band signal, received through the antenna, into a baseband signal. To this end, the wireless communication unit 210 may include a transmission filter, a reception filter, an amplifier, a mixer, an oscillator, a Digital-to-Analog Converter (DAC), an Analog-to-Digital Converter (ADC), or the like. Further, the wireless communication unit 210 may include a plurality of transmission/reception paths. In addition, the wireless communication unit 210 may include at least one antenna array including a plurality of antenna elements.

From the aspect of hardware, the wireless communication unit 210 may include a digital unit and an analog unit, and the analog unit may include a plurality of sub-units according to operating power, operating frequency, or the like. The digital unit may be configured as at least one processor (e.g., a Digital Signal Processor (DSP)).

As described above, the wireless communication unit 210 transmits and receives a signal. Accordingly, some or all of the wireless communication unit 210 may be referred to as a transmitter, a receiver, or a transceiver. In the following description, transmission and reception performed through a wireless channel are construed as including processing performed as above by the wireless communication unit 210.

The backhaul communication unit 220 provides an interface for performing communication with other nodes in a network. That is, the backhaul communication unit 220 converts a bit stream, which is transmitted from the base station to another node, for example, another access node, another base station, a higher node, a core network, or the like, into a physical signal, and converts a physical signal, which is received from another node, into a bit stream.

The storage unit 230 stores data, such as a default program, an application, and setting information, for the operation of the base station. The storage unit 230 may be configured as volatile memory, nonvolatile memory, or a combination of volatile memory and nonvolatile memory. The storage unit 230 provides the stored data in response to a request from the controller 240.

The controller 240 controls the overall operation of the base station. For example, the controller 240 transmits and receives a signal through the wireless communication unit 210 or the backhaul communication unit 220. Further, the controller 240 records and reads data in the storage unit 230. The controller 240 may perform functions of a protocol stack required by the communication standards. According to another embodiment, the protocol stack may be included in the wireless communication unit 210. To this end, the controller 240 may include at least one processor.

Figure 3:
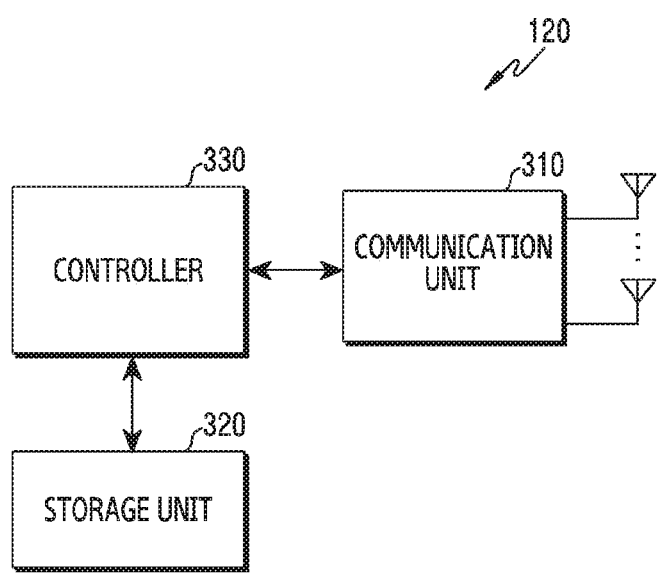
FIG. 3 illustrates the configuration of a terminal in a wireless communication system according to various embodiments of the present disclosure.

FIG. 3 illustrates the configuration of a terminal in a wireless communication system according to various embodiments of the present disclosure. The configuration illustrated in FIG. 3 may be construed as the configuration of the terminal 120. The terms 'unit,' '-or/er,' and the like used herein indicate a unit for processing at least one function or operation, which may be implemented by hardware, software, or a combination thereof.

Referring to FIG. 3, the terminal includes a communication unit 310, a storage unit 320, and a controller 330.

The communication unit 310 performs functions for transmitting or receiving a signal through a wireless channel. For example, the communication unit 310 performs a function of converting between a baseband signal and a bit stream according to the physical layer specification of a system. For example, in data transmission, the communication unit 310 encodes and modulates a transmitted bit stream to generate complex symbols. Further, in data reception, the communication unit 310 demodulates and decodes a baseband signal to reconstruct a received bit stream. The communication unit 310 upconverts a baseband signal into an RF band signal and may transmit the RF band signal through an antenna. The communication unit 310 downconverts an RF band signal, received through the antenna, into a baseband signal. For example, the communication unit 310 may include a transmission filter, a reception filter, an amplifier, a mixer, an oscillator, a DAC, an ADC, or the like.

Further, the communication unit 310 may include a plurality of transmission/reception paths. In addition, the communication unit 310 may include at least one antenna array including a plurality of antenna elements. From the aspect of hardware, the communication unit 310 may include a digital circuit and an analog circuit (e.g., a Radio Frequency Integrated Circuit (RFIC)). Here, the digital circuit and the analog circuit may be configured as a single package. Further, the communication unit 310 may include a plurality of RF chains. The communication unit 310 may perform beamforming.

As described above, the communication unit 310 transmits and receives a signal. Accordingly, part or the entirety of the communication unit 310 may be referred to as a transmitter, a receiver, or a transceiver. In the following description, transmission and reception performed through a wireless channel are construed as including processing performed as above by the communication unit 310.

The storage unit 320 stores data, such as a default program, an application, and setting information, for the operation of the terminal. The storage unit 320 may be configured as volatile memory, nonvolatile memory, or a combination of volatile memory and nonvolatile memory. The storage unit 320 provides the stored data in response to a request from the controller 330.

The controller 330 controls the overall operation of the terminal. For example, the controller 330 transmits and receives a signal through the communication unit 310. Further, the controller 330 records and reads data in the storage unit 320. The controller 330 may perform functions of a protocol stack required by the communication standards. To this end, the controller 330 may include at least one processor or microprocessor, or may be configured as a part of a processor.

Figure 4A:
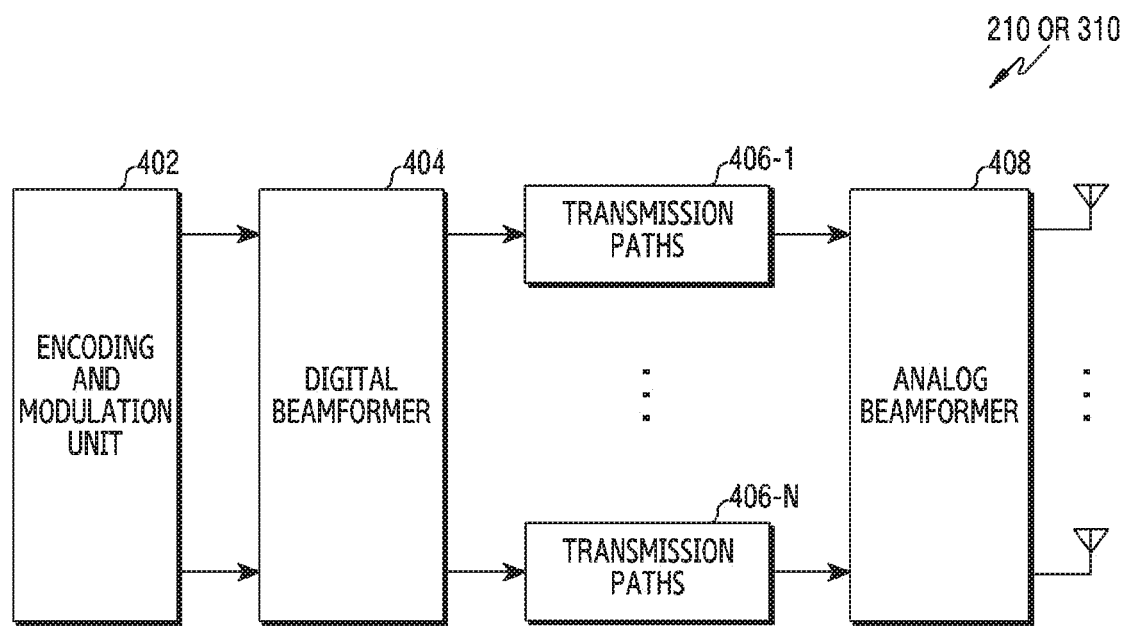
FIGS. 4A to 4C illustrate the configuration of a communication unit in a wireless communication system according to various embodiments of the present disclosure.
Figure 4B:
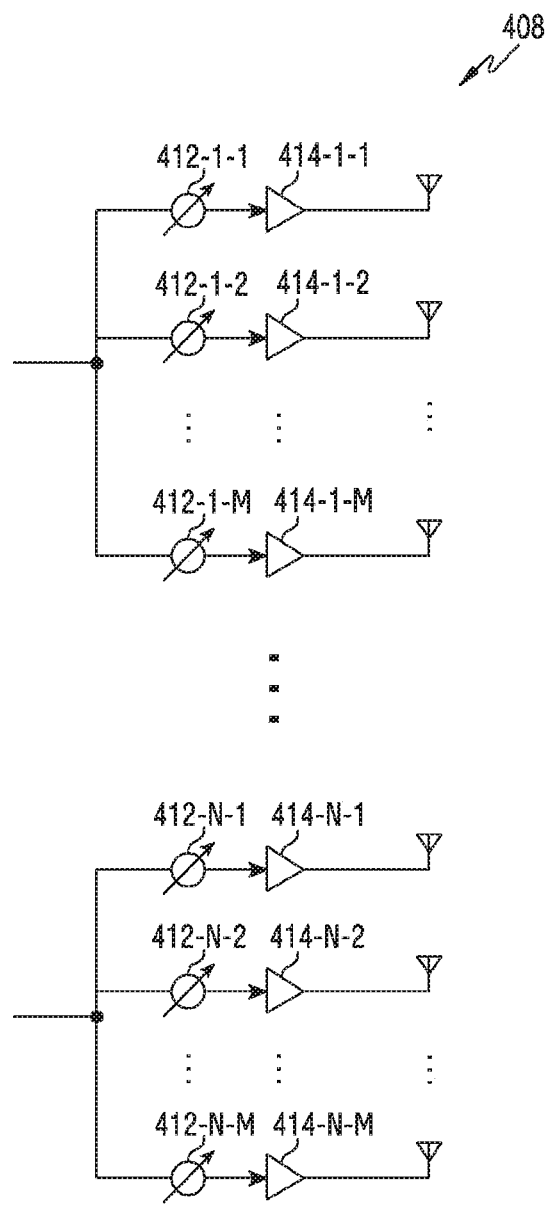
Figure 4C:
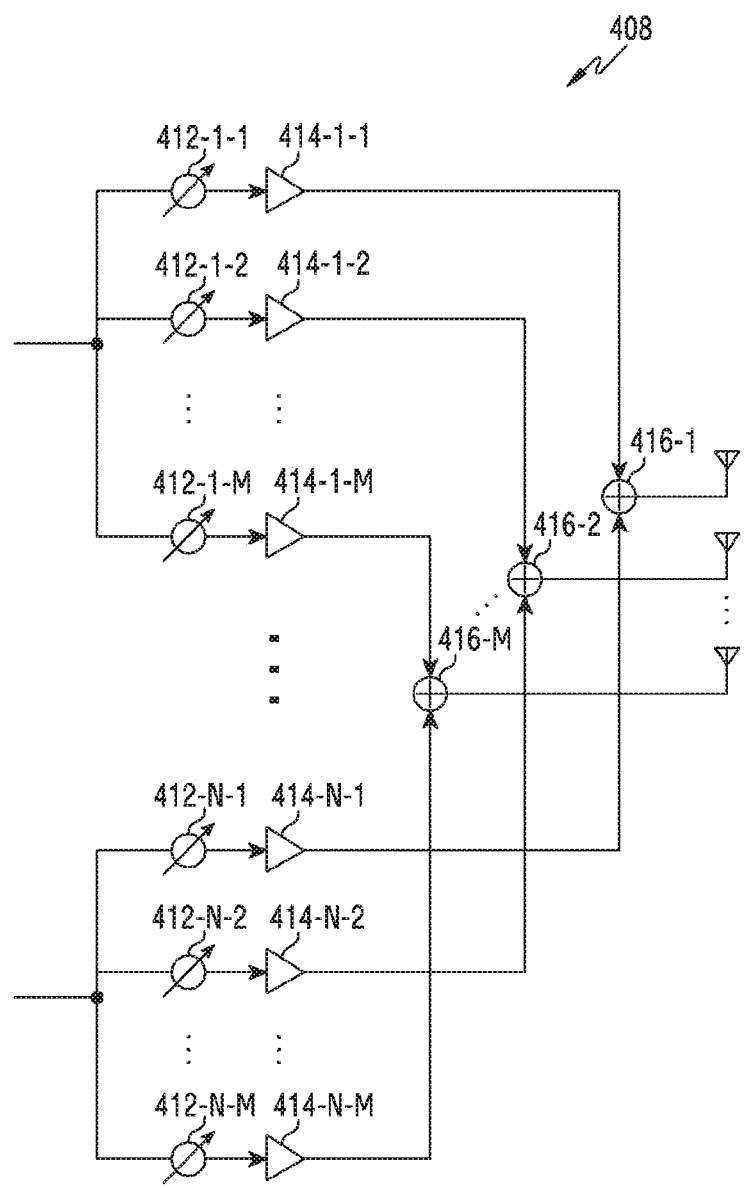

FIGS. 4A to 4C illustrate the configuration of a communication unit in a wireless communication system according to various embodiments of the present disclosure. FIGS. 4A to 4C illustrate examples of the detailed configuration of the wireless communication unit 210 in FIG. 2 or the communication unit 310 in FIG. 3. Specifically, FIGS. 4A to 4C illustrate components for performing beamforming as part of the wireless communication unit 210 in FIG. 2 or the communication unit 310 in FIG. 3.

Referring to FIG. 4A, the wireless communication unit 210 or the communication unit 310 includes an encoding and modulation unit 402, a digital beamformer 404, a plurality of transmission paths 406-1 to 406-N, and an analog beamformer 408.

The encoding and modulation unit 402 performs channel encoding. For channel encoding, at least one of Low-Density Parity-Check (LDPC) code, convolutional code, and polar code may be used. The encoding and modulation unit 402 generates modulation symbols by performing constellation mapping.

The digital beamformer 404 performs beamforming on a digital signal (e.g., the modulation symbols). To this end, the digital beamformer 404 multiplies the modulation symbols by beamforming weightings. Here, the beamforming weightings are used to change the size and phase of a signal, and may be referred to as a 'precoding matrix', a 'precoder', or the like. The digital beamformer 404 outputs the digital-beamformed modulation symbols to the plurality of transmission paths 406-1 to 406-N. Here, according to a Multiple-Input Multiple-Output (MIMO) transmission scheme, the modulation symbols may be multiplexed, or the same modulation symbols may be provided to the plurality of transmission paths 406-1 to 406-N.

The plurality of transmission paths 406-1 to 406-N converts the digital-beamformed digital signals into analog signals. To this end, each of the plurality of transmission paths 406-1 to 406-N may include an Inverse Fast Fourier Transform (IFFT) operation unit, a Cyclic Prefix (CP) inserter, a DAC, and an upconverter. The CP inserter is for an Orthogonal Frequency Division Multiplexing (OFDM) scheme, and may be excluded when another physical layer scheme (e.g., Filter Bank Multi-Carrier (FBMC)) is applied. That is, the plurality of transmission paths 406-1 to 406-N provides independent signal processing processes for a plurality of streams generated through digital beamforming. However, some components of the plurality of transmission paths 406-1 to 406-N may be used in common depending on the implementation scheme.

The analog beamformer 408 performs beamforming on the analog signals. To this end, the digital beamformer 404 multiplies the analog signals by beamforming weightings. Here, the beamforming weightings are used to change the size and phase of a signal. Specifically, depending on the plurality of transmission paths 406-1 through 406-N and the antennas, the analog beamformer 408 may be configured as shown in FIG. 4B or FIG. 4C depending on the connection structure between the plurality of transmission paths 406-1 to 406-N and antennas.

Referring to FIG. 4B, signals input to the analog beamformer 408 are transmitted through antennas via phase/size conversion and amplification. Here, the signals transmitted through respective paths are transmitted through different antenna sets, that is, different antenna arrays. Referring to processing of a signal input through a first path, the signal is converted by phase/size converters 412-1-1 to 412-1-M into signal sequences having different phases/sizes or the same phase/size, which are amplified by amplifiers 414-1-1 to 414-1-M and then transmitted through the antennas.

Referring to FIG. 4C, signals input to the analog beamformer 408 are transmitted through antennas via phase/size conversion and amplification. Here, the signals through respective paths are transmitted through the same antenna set, that is, the same antenna array. Referring to processing of a signal input through a first path, the signal is converted by phase/size converters 412-1-1 to 412-1-M into signal sequences having different phases/sizes or the same phase/size, which are amplified by amplifiers 414-1-1 to 414-1-M. Then, the amplified signals are added by adders 416-1-1 to 416-1-M on the basis of an antenna element so as to be transmitted through one antenna array and are then transmitted through the antennas.

FIG. 4B shows an example in which an independent antenna array is used for each transmission path, while FIG. 4C shows an example in which the transmission paths share a single antenna array. However, according to another embodiment, some transmission paths may use independent antenna arrays, and the remaining transmission paths may share a single antenna array. Further, according to still another embodiment, a structure that can adaptively change according to the situation may be used by applying a switchable structure between transmission paths and antenna arrays.

The Internet has evolved from a human-centered connection network, in which humans create and consume information, into an Internet of Things (IoT) network, in which distributed components, such as objects, may exchange and process information. Internet-of-Everything (IoE) technology, in which big-data processing technology is combined with the IoT through connection with a cloud server and the like, has also emerged. As technological elements such as sensing technology, wired/wireless communication and network infrastructure, service interface technology, and security technology are required to implement IoT, technologies for sensor networks, Machine-To-Machine (M2M) communication, and Machine-Type Communication (MTC) have recently been studied for connection between objects. In an IoT environment, an intelligent Internet Technology (IT) service that collects and analyzes data generated from connected objects may be provided to create new value in human lives. The IoT is applicable to the fields of a smart home, a smart building, a smart city, a smart car or connected car, a smart grid, health care, a smart home appliance, advanced medical care services, and the like through convergence and integration of existing information technology with various industries.

Accordingly, various attempts are being made to apply a 5G communication system to the IoT network. For example, 5G communication technologies, such as a sensor network, M2M communication, and MTC, are implemented by beamforming, MIMO, and array-antenna schemes. Applying a cloud Radio Access Network (RAN) as the big-data processing technology described above is an example of the convergence of 5G technology and IoT technology.

Beamforming is a technique by which radio waves are concentrated to arrive on an area in a particular direction using two or more array antennas to thereby increase the transmission distance, while the strength of signals received in directions other than the particular direction is decreased in order to reduce unnecessary signal interference. When beamforming is applied, an increase in the size of a service area and a reduction in signal interference may be expected.

To support communication for beamforming, beamforming for an uplink and a downlink is necessary, in which case it is very efficient to use an SRS as a training signal for uplink beamforming. However, UE-specific SRS transmission is performed in a subframe allocated through a cell-specific SRS configuration. Therefore, it is necessary to consider employing an SRS for Channel State Information (CSI) acquisition and an SRS for beam management.

5G communication employs not only beamforming but also the concept of a bandwidth part (BWP). A BWP is a concept whereby the bandwidth that is supportable by a terminal is set within a system bandwidth and is employed as a BWP when the terminal does not have the capability to support the system bandwidth.

However, when the terminal is not capable of supporting the entire bandwidth, the terminal cannot transmit an SRS by performing frequency hopping in the entire bandwidth. Therefore, a new signal is needed for frequency hopping between BWPs in consideration of the bandwidth of a BWP or the entire bandwidth.

When beamforming is applied, it may be expected to increase a service area and to reduce signal interference. To this end, however, it is necessary to match the directions of beams from a base station and a terminal to form an optimal beam. That is, it is necessary to find the beam direction having the optimal beam intensity.

For a downlink, a periodic synchronization signal or a UE-specific Channel State Information-Reference Signal (CSI-RS) may be used as a training signal for beamforming. A CSI-RS is used as a DL beam training signal in FD-MIMO.

For an uplink, however, a training signal for beamforming is not defined. A Random Access Channel (RACH), an SRS, or an uplink (UL) DeModulation Reference Signal (UL DMRS) may be considered as a UL beam training signal. However, among these signals, a RACH and a UL DMRS are not periodic.

For an SRS, in LTE, an SRS subframe that a UE actually transmits is specified and transmitted through a cell-specific SRS configuration and a UE-specific SRS configuration. The method for transmitting an SRS in LTE is described in detail below.

TABLE 1

| srs-SubframeConfig | Binary | Configuration Period $T_{SFC}$ (subframes) | Transmission offset $\Delta_{SFC}$ (subframes) |
|---|---|---|---|
| 0 | 0000 | 5 | {1} |
| 1 | 0001 | 5 | {1, 2} |
| 2 | 0010 | 5 | {1, 3} |
| 3 | 0011 | 5 | {1, 4} |
| 4 | 0100 | 5 | {1, 2, 3} |
| 5 | 0101 | 5 | {1, 2, 4} |
| 6 | 0110 | 5 | {1, 3, 4} |
| 7 | 0111 | 5 | {1, 2, 3, 4} |
| 8 | 1000 | 10 | {1, 2, 6} |
| 9 | 1001 | 10 | {1, 3, 6} |
| 10 | 1010 | 10 | {1, 6, 7} |
| 11 | 1011 | 10 | {1, 2, 6, 8} |
| 12 | 1100 | 10 | {1, 3, 6, 9} |
| 13 | 1101 | 10 | {1, 4, 6, 7} |
| 14 | 1110 | reserved | reserved |
| 15 | 1111 | reserved | reserved |

Table 1 shows an SRS subframe configuration for frame structure 2. Table 1 shows an SRS period and offset according to srs-SubframeConfig transmitted as a cell-specific parameter. In LTE, different SRS subframes may be determined according to FDD and TDD. An embodiment of the present disclosure, however, illustrates a method in TDD as a method for determining a subframe transmitting an SRS. srs-SubframeConfig is transmitted to a UE through a System Information Block (SIB), and the UE estimates a subframe index satisfying $\lfloor n_s/2 \rfloor$ mod $T_{SFC} \in \Delta_{SFC}$ using the SRS period and offset values illustrated in Table 1.

TABLE 2

| | subframe index n | | | | | | | | |
|---|---|---|---|---|---|---|---|---|---|
| | 1 | | | | | 6 | | | |
| 0 | 1st symbol of UpPTS | 2nd symbol of UpPTS | 2 | 3 | 4 | 5 | 1st symbol of UpPTS | 2nd symbol of UpPTS | 7 | 8 | 9 |
| $k_{SRS}$ in case UpPTS length of 2 symbols | 0 | 1 | 2 | 3 | 4 | | 5 | 6 | 7 | 8 | 9 |
| $k_{SRS}$ in case UpPTS length of 1 symbols | 1 | | 2 | 3 | 4 | | 6 | | 7 | 8 | 9 |

Table 2 shows a UE-specific subframe index (subframe index within the frame for TDD) for transmitting an SRS where the length of a UpPTS is 1 or 2 in LTE. Since the length of one frame is 10 ms, a subframe index value is defined to support a period of 2, 5, or 10 ms.

TABLE 3

| SRS Configuration Index $I_{SRS}$ | SRS Periodicity $T_{SRS}$ (ms) | SRS Subframe Offset $T_{offset}$ |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS}$-10 |
| 15-24 | 10 | $I_{SRS}$-15 |
| 25-44 | 20 | $I_{SRS}$-25 |
| 45-84 | 40 | $I_{SRS}$-45 |
| 85-164 | 80 | $I_{SRS}$-85 |
| 165-324 | 160 | $I_{SRS}$-165 |
| 325-644 | 320 | $I_{SRS}$-325 |
| 645-1023 | reserved | reserved |

Table 3 shows a table for determining a UE-specific SRS subframe (UE-specific SRS periodicity and subframe offset configuration for trigger type 0, TDD). In LTE, a UE-specific SRS transmission subframe index may be finally determined using the values illustrated in Tables 2 and 3. The SRS configuration index illustrated in Table 3 is transmitted to a UE through a UE-specific RRC configuration. Trigger type 0, illustrated in Table 3, refers to periodic SRS transmission.

For a subframe transmitting an SRS, a cell-specific SRS subframe illustrated in Table 1 is estimated, and an SRS is transmitted in the same subframe as that transmitting a UE-specific SRS within the estimated cell-specific SRS subframe.

5G communication supports not only periodic SRS transmission and aperiodic SRS transmission, supported by LTE, but also semi-persistent SRS transmission. Another difference from LTE is that 5G communication does not apply a cell-specific SRS configuration in order to provide maximum flexibility. That is, unlike in LTE, an SRS is transmitted only through a UE-specific configuration.

In order to transmit a periodic SRS using only the UE-specific configuration, Table 3 may be changed into Table 4 below.

TABLE 4

| SRS Configuration Index $I_{SRS}$ | SRS Periodicity $T_{SRS}$ (slot) | SRS slot Offset $T_{offset}$ |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS}$-10 |
| 15-24 | 10 | $I_{SRS}$-15 |
| 25-44 | 20 | $I_{SRS}$-25 |
| 45-84 | 40 | $I_{SRS}$-45 |
| 85-164 | 80 | $I_{SRS}$-85 |
| 165-324 | 160 | $I_{SRS}$-165 |
| 325-644 | 320 | $I_{SRS}$-325 |
| 645-1284 | 640 | $I_{SRS}$-645 |
| 1285-2047 | reserved | reserved |

Table 4 shows another table for determining a UE-specific SRS subframe (UE-specific SRS periodicity and slot offset configuration for periodic SRS transmission, TDD). As shown in Table 4, 5G communication configures an SRS time resource based on a slot, instead of supporting an SRS subframe. An SRS time resource is configured based on a slot because the subcarrier spacing of a data channel supports various numerologies, such as 15, 30, 60, and 120 kHz. Configuring a slot-based period makes it possible to allocate a scalable SRS period according to data numerology. In addition, one major feature of slot-based period configuration is that transmission in one symbol is not regarded as subframe transmission, as in LTE. That is, as shown in Table 2, one or two symbols in a UpPTS are considered to be a subframe unit, and a period allocated in a subframe unit is considered only to be a period in a pure slot unit. Therefore, one, two, or four symbols can be allocated as SRS symbols in one slot, but an SRS slot period is allocated regardless of the number of symbols. Unlike in LTE, a 640-slot period is added in order to support a wider period.

Figure 5:
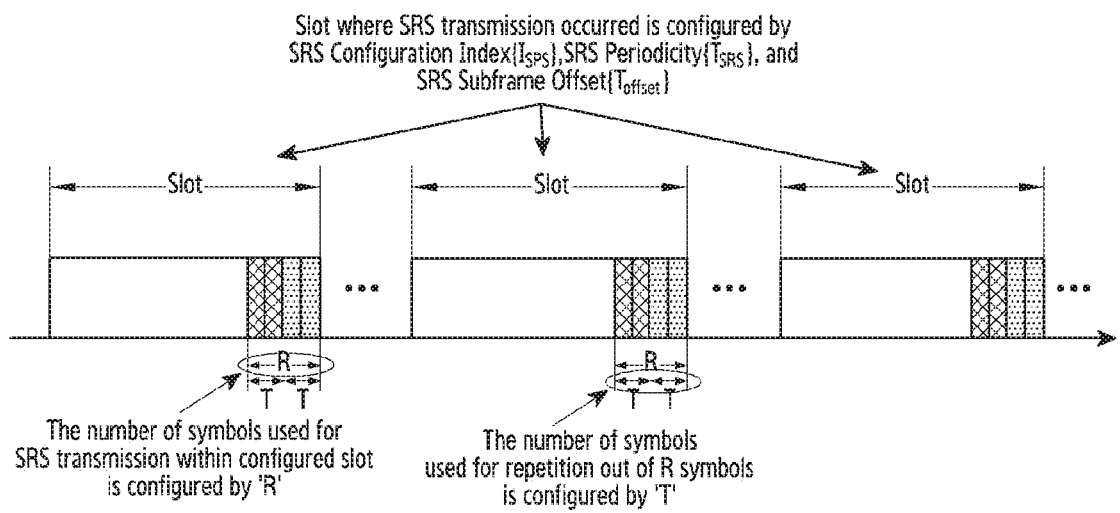
FIG. 5 illustrates an example of SRS transmission based on a slot-based period in a wireless communication system according to various embodiments of the present disclosure.

FIG. 5 illustrates an example of SRS transmission based on a slot-based period. As described above, a period only in a slot unit is allocated regardless of the number of symbols in a slot, and the period in the slot unit is illustrated in Table 4. Therefore, it is necessary to newly define the SRS operation of a terminal on one, two, or four symbols in a slot.

TABLE 5

| SRS Configuration Index $I_{SRS}$ | SRS Periodicity $T_{SRS}$ (slot) | SRS slot Offset $T_{offset}$ |
|---|---|---|
| 0-1 | 2 | $I_{SRS}$ |
| 2-6 | 5 | $I_{SRS}-2$ |
| 7-16 | 10 | $I_{SRS}-7$ |
| 17-36 | 20 | $I_{SRS}-17$ |
| 37-76 | 40 | $I_{SRS}-37$ |
| 77-156 | 80 | $I_{SRS}-77$ |
| 157-316 | 160 | $I_{SRS}-157$ |
| 317-636 | 320 | $I_{SRS}-317$ |
| 637-1276 | 640 | $I_{SRS}-637$ |
| 1277-2047 | resesved | Reserved |

Table 5 shows a table for determining an SRS period (UE-specific SRS periodicity and slot offset configuration for periodic SRS transmission, FDD) in FDD.

Referring to Table 4 or Table 5, a slot-based SRS period is configured to support various numerologies, as in TDD. Further, the 640-slot period is added in order to support a wider period.

Alternatively, TDD and FDD may use the same table. Table 6 shows an SRS configuration table for FDD and TDD. Here, in addition to the LTE-supported rows, an SRS period may be added in consideration of the characteristics of 5G communication. 5G supports uplink (UL)/downlink (DL) configuration switching periods of 0.5, 1, 2, 5, and 10 ms and supports subcarrier spacing of a data channel of 15, 30, 60, and 120 kHz. Therefore, considering the number of slots that can be allocated in the UL/DL configuration switching periods, a slot period of a multiple of 1, 2, 4, 8, and 16 slots may be added to the existing table. Accordingly, an SRS period can be allocated considering the UL/DL configuration switching periods.

TABLE 6

| SRS Configuration Index $I_{SRS}$ | SRS Periodicity $T_{SRS}$ (slot) | SRS slot Offset $T_{offset}$ | Note |
|---|---|---|---|
| 0-1 | 2 | $I_{SRS}$ | LTE supported |
| 2-5 | 4 | $I_{SRS}-2$ | Considering DL/UL configuration switching periodicity |
| 6-10 | 5 | $I_{SRS}-6$ | LTE supported |
| 11-18 | 8 | $I_{SRS}-11$ | Considering DL/UL configuration switching periodicity |
| 19-28 | 10 | $I_{SRS}-19$ | LTE supported |
| 29-44 | 16 | $I_{SRS}-29$ | Considering DL/UL configuration switching periodicity |
| 45-64 | 20 | $I_{SRS}-45$ | LTE supported |
| 65-96 | 32 | $I_{SRS}-65$ | Considering DL/UL configuration switching periodicity |
| 97-136 | 40 | $I_{SRS}-97$ | LTE supported |
| 137-200 | 64 | $I_{SRS}-137$ | Considering DL/UL configuration switching periodicity |
| 201-280 | 80 | $I_{SRS}-201$ | LTE supported |
| 281-408 | 128 | $I_{SRS}-281$ | Considering DL/UL configuration switching periodicity |
| 409-568 | 160 | $I_{SRS}-409$ | LTE supported |
| 569-824 | 256 | $I_{SRS}-569$ | Considering DL/UL configuration switching periodicity |
| 825-1144 | 320 | $I_{SRS}-825$ | LTE supported |
| 1145-1656 | 512 | $I_{SRS}-1145$ | Considering DL/UL configuration switching periodicity |
| 1657-2296 | 640 | $I_{SRS}-1645$ | CSI-RS supported |
| 2297-4095 | reserved | reserved | |

Table 6 shows a table for determining an SRS period (UE-specific SRS periodicity and slot offset configuration for periodic SRS transmission, FDD and TDD) in FDD and TDD.

Figure 6:
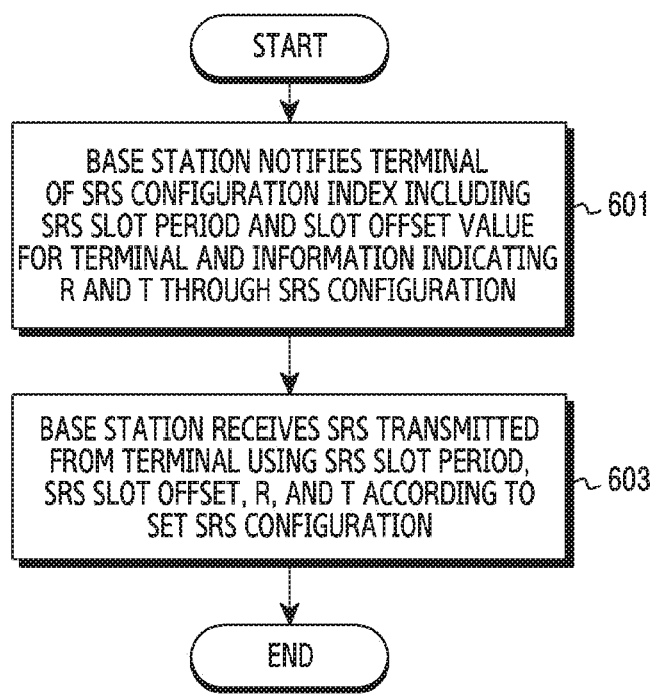
FIG. 6 illustrates an operation method for SRS reception in a wireless communication system according to various embodiments of the present disclosure.
Figure 7:
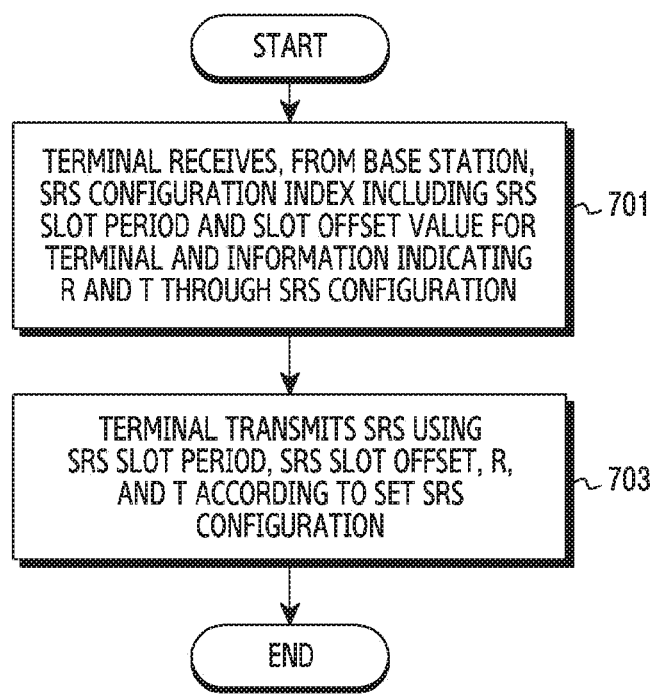
FIG. 7 illustrates an operation method for SRS transmission in a wireless communication system according to various embodiments of the present disclosure.

FIGS. 6 and 7 respectively illustrate an operational method for SRS reception and an operational method for SRS transmission in a wireless communication system according to various embodiments of the present disclosure.

FIGS. 6 and 7 illustrate SRS reception and transmission between a base station and a terminal using a slot-based SRS period and a slot-based offset shown in Table 4, Table 5, or Table 6 and a symbol used for an SRS in a slot and a symbol for repeated SRS transmission in a symbol shown in FIG. 5.

Referring to FIG. 6, in operation 601, the base station notifies the terminal of an SRS configuration index including an SRS slot period and a slot offset value for the terminal, shown in Table 3, Table 4, or Table 5, information on the number (R) of symbols used for SRS transmission in a configured slot, and information on the number (T) of symbols repeatedly transmitted among the R symbols through an SRS configuration. When receiving an SRS transmitted from the terminal in operation 603, the base station receives the SRS corresponding to a value configured in operation 601.

FIG. 7 illustrates an operation method for SRS transmission in a wireless communication system according to various embodiments of the present disclosure.

In operation 701 of FIG. 7, the terminal obtains, from the base station, an SRS configuration index including an SRS slot period and a slot offset value for the terminal, shown in Table 3, Table 4, or Table 5, information on the number (R) of symbols used for SRS transmission in a configured slot, and information on the number (T) of symbols repeatedly transmitted among the R symbols through an SRS configuration. When transmitting an SRS in operation 703, the terminal transmits the SRS corresponding to a value configured in operation 701.

Figure 8:
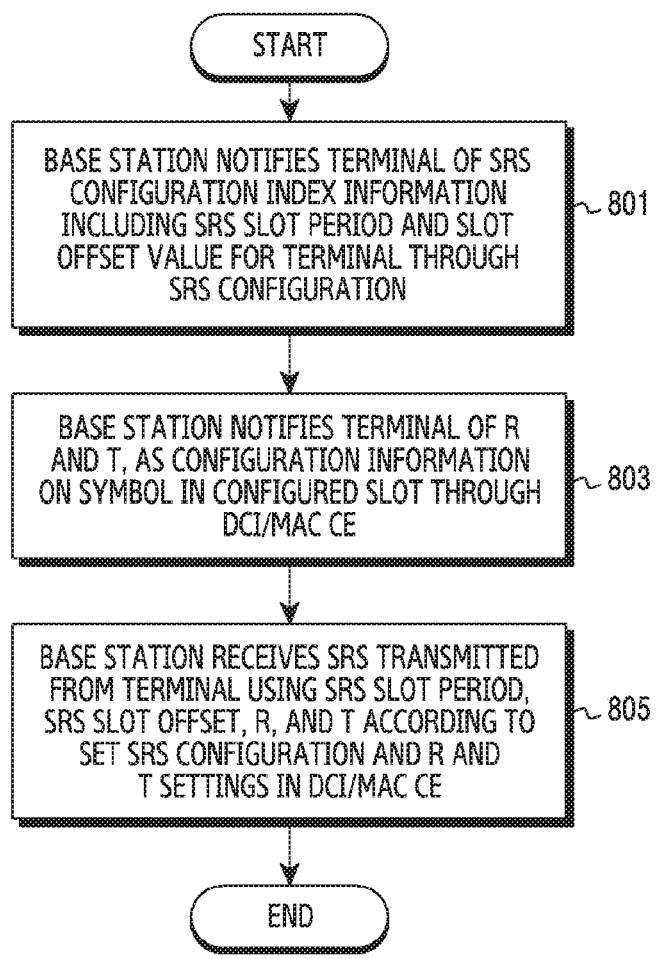
FIG. 8 illustrates an operation method for SRS reception in a wireless communication system according to various embodiments of the present disclosure.

FIG. 8 illustrates an operation method for SRS reception in a wireless communication system according to various embodiments of the present disclosure. FIG. 8 illustrates a process in which a base station allocates an SRS resource through an SRS configuration and downlink control information (DCI) or a medium access control (MAC) control element (CE) and receives an SRS.

In operation 801 of FIG. 8, the base station transmits an SRS configuration index including an SRS slot period and a slot offset value for the terminal shown in Table 3. Table 4, or Table 5 to the terminal through an SRS configuration. In a 5G system, a DL-only slot, a UL-only slot, and a UL/DL-mixed slot may be used, and the UL/DL ratio in a UL/DL-mixed slot may be varied. Therefore, the base station transmits information on the number (R) of symbols used for SRS transmission in a configured slot to support dynamic SRS transmission and information on the number (T) of symbols repeatedly transmitted among the R symbols to the terminal through DCI or an MAC CE (operation 803). When receiving an SRS transmitted from the terminal, the base station receives the SRS corresponding to a value configured in operations 801 and 803 (operation 805).

Figure 9:
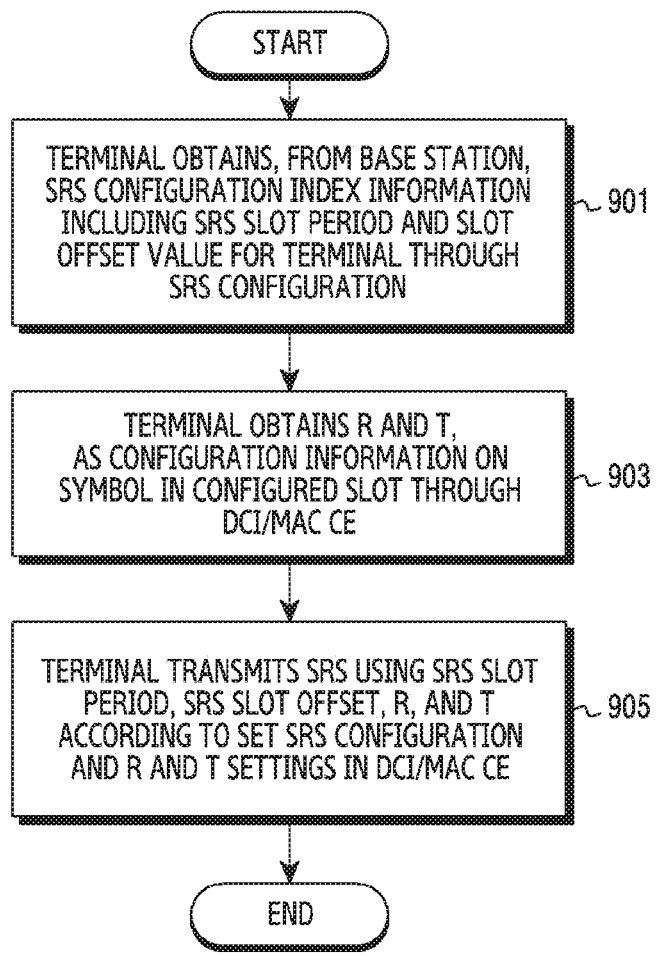
FIG. 9 illustrates an operation method for SRS transmission in a wireless communication system according to various embodiments of the present disclosure.

FIG. 9 illustrates an operation method for SRS transmission in a wireless communication system according to various embodiments of the present disclosure. FIG. 9 illustrates a process in which a terminal obtains an SRS resource through an SRS configuration and DCI or an MAC CE and transmits an SRS.

In operation 901 of FIG. 9, the terminal receives an SRS configuration index including an SRS slot period and a slot offset value for the terminal, shown in Table 3, Table 4, or Table 5, from a base station through an SRS configuration. Further, the terminal obtains information on the number (R) of symbols used for SRS transmission in a configured slot to support dynamic SRS transmission and information on the number (T) of symbols repeatedly transmitted among the R symbols from the base station through DCI or an MAC CE (operation 903). When transmitting an SRS, the terminal transmits the SRS corresponding to a value configured in operations 901 and 903 (operation 905).

In addition to the foregoing methods, R and T may be transmitted through an SRS configuration, DCI, or an MAC CE, and combinations thereof may be considered.

R has a value of 1 to 4, and T also has a value of 1 to 4. Since R is always equal to or greater than T, (R, T) can have six combinations, which are (4, 4), (4, 2), (4,1), (2,2), (2,1), and (1, 1). Therefore, a combination of R and T may be indicated by allocating a three-bit indicator instead of allocating two separate indicators as described above. This three-bit indicator is also transmitted to the terminal via the SRS configuration, DCI, or MAC CE.

5G communication allows repeated SRS transmission in a slot, and supports both frequency hopping in a slot and frequency hopping between slots. Therefore, in order to support these functions, a base station needs to notify a terminal of the number (R) of symbols used by the terminal for SRS transmission in a configured slot and the number (T) of symbols for repeated SRS transmission among the R allocated symbols through Table 4, 5, or 6. Information on R and T may be provided to the terminal through an SRS configuration or may be provided to the terminal through DCI/MAC CE for dynamic SRS transmission.

The terminal may obtain an SRS transmission period with reference to Table 4, 5, or 6 and may configure a slot satisfying the following equation as an SRS transmission slot.

$$(n_f N_{slot}^{frame,\mu} + n_{s,f}^{\mu} - T_{offset}) \bmod T_{SRS} = 0$$

Here, $n_f$ denotes a frame index, $N_{slot}^{frame,\mu}$, denotes the total number of slots in one frame, $n_{s,f}^{\mu}$ denotes a slot index according to subcarrier spacing u ((15/30/60/120) kHz), $T_{SRS}$ denotes a slot-based SRS transmission period, and $T_{offset}$ denotes a slot-based slot offset. Accordingly, the terminal can transmit an SRS via a slot in a frame according to an SRS transmission period and a slot index satisfying a slot-based offset.

Figure 10:
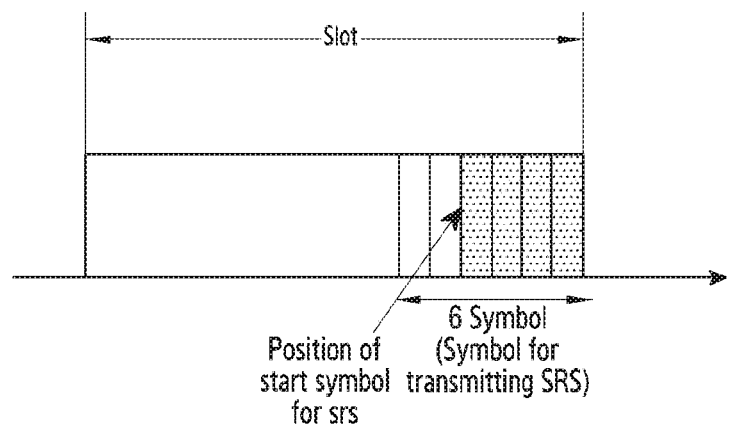
FIG. 10 illustrates an example of the position of a start symbol for an SRS in a slot according to various embodiments of the present disclosure.

Also, since an SRS can be transmitted at six symbol positions in the last position of a slot, the base station needs to notify the terminal of an accurate start symbol position. FIG. 10 illustrates an example of the position of a start symbol for an SRS in a slot. An SRS can have up to four symbols in a slot, but may be transmitted during the last four symbols in the slot in consideration of the position of a symbol for a PUCCH (as in the example of FIG. 8), may be transmitted during four symbols before the last one symbol in the slot considered for a PUCCH, or may be transmitted during four symbols before the last two symbols considered for a PUCCH. Therefore, the base station needs to notify the terminal of the accurate position of a start symbol for the SRS. This information may be notified via DCI or an MAC CE for utmost efficiency in order to maximally support dynamic SRS transmission, and may be made known through an SRS configuration in order to reduce DCI overhead. This information can be applied to all of periodic SRS transmission, aperiodic SRS transmission, and semi-persistent SRS transmission.

Further, the terminal and the base station may implicitly agree that an SRS is transmitted or received in a symbol period before a symbol for a PUCCH, instead of reporting the position of a start symbol for an SRS through signaling according to the above method. That is, when a PUCCH is one symbol, a period corresponding to SRS symbol length is set except for the last one symbol in a slot, thereby transmitting an SRS.

For aperiodic SRS transmission, two methods may be considered. The first method is an operation performed using only SRS request information transmitted via DCI or MAC CE, without any resource configuration shown in Table 4, 5, or 6. In this case, the base station needs to transmit an SRS request signal for SRS transmission to the terminal through DCI or an MAC CE before a (kth) slot relative to an (nth) slot for SRS transmission to the terminal. The terminal receives information for aperiodic SRS transmission through an SRS configuration and transmits a resource position in the time domain (cyclic shift/root sequence ID/frequency start position/SRS length/comb type and the like) in a triggering form through the DCI or MAC CE. In a second method for aperiodic SRS transmission, all candidate slots for SRS transmission are allocated as in Tables 4 and 5, an SRS request is received through DCI or an MAC CE, and then an SRS is transmitted via the first candidate slot for SRS transmission after a kth slot after receiving the SRS request.

For semi-persistent SRS transmission, a candidate SRS slot for SRS transmission may be allocated as in Table 4, 5, or 6, activation/deactivation information may be received through an MAC CE or DCI, and then a semi-persistent period may be configured. Alternatively, after receiving the activation information without the deactivation information, an SRS may be transmitted during k slots.

Methods according to embodiments stated in claims and/or specifications of the present disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

Although the present disclosure has been described with various embodiments, various changes and modifications may be suggested to one skilled in the art. It is intended that the present disclosure encompass such changes and modifications as fall within the scope of the appended claims.

What is claimed is:

1. A user equipment (UE) in a wireless communication system, the UE comprising:
    at least one transceiver; and
    at least one processor operably coupled to the at least one transceiver, and configured to:
        control the at least one transceiver to receive, from a base station, a sounding reference signal (SRS) configuration including:
            information for indicating a number of at least one symbol of an SRS transmission within a slot, wherein the number of the at least one symbol is 1, 2, or 4,
            information for indicating a repetition number, wherein the repetition number is smaller than or equal to the number of the at least one symbol, and
            information on a slot periodicity and a slot offset for the slot periodicity, and
        control the at least one transceiver to transmit, to the base station, at least one SRS based on the SRS configuration and a numerology configuration indicating a subcarrier spacing.

2. The UE of claim 1, wherein the SRS configuration is transmitted via a radio resource control (RRC) signaling.

3. The UE of claim 1, wherein the SRS configuration includes information for indicating a start symbol position for the SRS transmission, and
    wherein the start symbol position indicates one of last six symbols of the slot.

4. The UE of claim 1, wherein the at least one processor is, in order to transmit the at least one SRS, configured to:
    control the at least one transceiver to receive, from the base station, an activation command using a medium access control (MAC) control element (CE) for a semi-persistent SRS transmission; and
    identify at least one slot based on the SRS configuration and the numerology configuration after receiving the activation command.

5. The UE of claim 4, wherein, the at least one processor is further configured to:
    control the at least one transceiver to receive, from the base station, a deactivation command using a MAC CE; and
    control the at least one transceiver to cease an SRS transmission according to the slot periodicity after receiving the deactivation command.

6. The UE of claim 1, wherein, the at least one processor is further configured to:
    control the at least one transceiver to receive, from the base station, downlink control information (DCI) for an aperiodic SRS transmission; and
    after at least one slot from a slot in which the DCI is received, control the at least one transceiver to transmit an SRS to the base station.

7. A base station in a wireless communication system, the base station comprising:
    at least one transceiver; and
    at least one processor operably coupled to the at least one transceiver, and configured to:
        control the at least one transceiver to transmit, to a user equipment (UE), a sounding reference signal (SRS) configuration including:
            information for indicating a number of at least one symbol of an SRS transmission within a slot, wherein the number of the at least one symbol is 1, 2, or 4,
            information for indicating a repetition number, wherein the repetition number is smaller than or equal to the number of the at least one symbol, and
            information on a slot periodicity and a slot offset for the slot periodicity, and
        control the at least one transceiver to receive, from the UE, at least one SRS based on the SRS configuration and a numerology configuration indicating a subcarrier spacing.

8. The base station of claim 7, wherein the SRS configuration is transmitted via a radio resource control (RRC) signaling.

9. The base station of claim 7, wherein the SRS configuration includes information for indicating a start symbol position for the SRS transmission, and
    wherein the start symbol position indicates one of last six symbols of the slot.

10. The base station of claim 7, wherein the at least one processor is, in order to receive the at least one SRS, configured to:
    control the at least one transceiver to transmit, to the UE, an activation command using a medium access control (MAC) control element (CE) for a semi-persistent SRS transmission; and
    identify at least one slot based on the SRS configuration and the numerology configuration after a transmission of the activation command.

11. The base station of claim 10,
    wherein the at least one processor is further configured to transmit, to the UE, a deactivation command using a MAC CE, and wherein the deactivation command is used to cease an SRS transmission according to the slot periodicity from the UE.

12. The base station of claim 7, wherein the at least one processor is further configured to:
   control the at least one transceiver to transmit, to the UE, downlink control information (DCI) for an aperiodic SRS transmission; and
   after at least one slot from a slot in which the DCI is transmitted, control the at least one transceiver to receive an SRS to the base station.

13. A method for operating a user equipment (UE) in a wireless communication system, the method comprising:
   receiving, from a base station, a configuration message regarding a sounding reference signal (SRS) configuration including:
      information for indicating a number of at least one symbol of an SRS transmission within a slot, wherein the number of the at least one symbol is 1, 2, or 4,
      information for indicating a repetition number, wherein the repetition number is smaller than or equal to the number of the at least one symbol, and
      information on a slot periodicity and a slot offset for the slot periodicity; and
   transmitting, to the base station, at least one SRS based on the SRS configuration and a numerology configuration indicating a subcarrier spacing.

14. The method of claim 13, wherein the SRS configuration is transmitted via a radio resource control (RRC) signaling.

15. The method of claim 13, wherein the SRS configuration includes:
   information for indicating a start symbol position for the SRS transmission,
   wherein the start symbol position indicates one of last six symbols of the slot.

16. The method of claim 13, wherein transmitting the at least one SRS comprises:
   receiving, from the base station, an activation command using a medium access control (MAC) control element (CE) for a semi-persistent SRS transmission; and
   identifying at least one slot based on the SRS configuration and the numerology configuration after receiving the activation command.

17. The method of claim 16, further comprising:
   receiving, from the base station, a deactivation command using a MAC CE; and
   ceasing an SRS transmission according to the slot periodicity after receiving the deactivation command.

18. The method of claim 13, further comprising:
   receiving, from the base station, downlink control information (DCI) for an aperiodic SRS transmission; and
   after at least one slot from a slot in which the DCI is received, transmitting an SRS to the base station.

19. The UE of claim 1, wherein the at least one SRS is identified based on a following equation:

$$(n_f N_{slot}^{frame,\mu} + n_{s,f}^{\mu} - T_{offset}) \bmod T_{SRS} = 0,$$

where $n_f$ denotes a frame index, $N_{slot}^{frame,\mu}$ denotes a total number of slots in one frame according to the subcarrier spacing u, $n_{s,f}^{\mu}$ denotes a slot index according to the subcarrier spacing u, $T_{SRS}$ denotes the slot periodicity, and $T_{offset}$ denotes the slot offset.

20. The base station of claim 7, wherein the at least one SRS is identified based on a following equation:

$$(n_f N_{slot}^{frame,\mu} + n_{s,f}^{\mu} - T_{offset}) \bmod T_{SRS} = 0,$$

where $n_f$ denotes a frame index, $N_{slot}^{frame,\mu}$ denotes a total number of slots in one frame according to the subcarrier spacing u, $n_{s,f}^{\mu}$ denotes a slot index according to the subcarrier spacing u, $T_{SRS}$ denotes the slot periodicity, and $T_{offset}$ denotes the slot offset.

21. The method of claim 13, wherein the at least one SRS is identified based on a following equation:

$$(n_f N_{slot}^{frame,\mu} + n_{s,f}^{\mu} - T_{offset}) \bmod T_{SRS} = 0,$$

where $n_f$ denotes a frame index, $N_{slot}^{frame,\mu}$ denotes a total number of slots in one frame according to the subcarrier spacing u, $n_{s,f}^{\mu}$ denotes a slot index according to the subcarrier spacing u, $T_{SRS}$ denotes the slot periodicity, and $T_{offset}$ denotes the slot offset.

* * * * *